(12) United States Patent
Jun et al.

(10) Patent No.: US 9,967,573 B2
(45) Date of Patent: May 8, 2018

(54) CODEC, SYSTEM ON CHIP (SOC) INCLUDING THE SAME, AND DATA PROCESSING SYSTEM INCLUDING THE SOC

(71) Applicant: SAMSUNG ELECTRONICS CO., LTD., Suwon-si, Gyeonggi-do (KR)

(72) Inventors: Sung Ho Jun, Suwon-si (KR); Hyuk Jae Jang, Suwon-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 269 days.

(21) Appl. No.: 14/868,427

(22) Filed: Sep. 29, 2015

(65) Prior Publication Data

US 2016/0150229 A1    May 26, 2016

(30) Foreign Application Priority Data

Nov. 24, 2014 (KR) .................. 10-2014-0164123

(51) Int. Cl.

| H04N 19/172 | (2014.01) |
|---|---|
| *H04N 19/115* | (2014.01) |
| *H04N 19/124* | (2014.01) |
| *H04N 19/149* | (2014.01) |
| *H04N 19/177* | (2014.01) |
| H04N 19/159 | (2014.01) |
| H04N 19/184 | (2014.01) |
| H04N 19/426 | (2014.01) |

(52) U.S. Cl.
CPC ......... *H04N 19/172* (2014.11); *H04N 19/115* (2014.11); *H04N 19/124* (2014.11); *H04N 19/149* (2014.11); *H04N 19/177* (2014.11); *H04N 19/184* (2014.11); *H04N 19/426* (2014.11)

(58) Field of Classification Search
CPC .. H04N 19/172; H04N 19/124; H04N 19/149; H04N 19/115; H04N 19/152; H04N 19/159; H04N 19/177; H04N 19/103
See application file for complete search history.

(56) References Cited

U.S. PATENT DOCUMENTS

| 6,072,831 A | 6/2000 | Chen |
|---|---|---|
| 6,212,232 B1 | 4/2001 | Reed et al. |
| 6,850,565 B2 | 2/2005 | Martins et al. |
| 6,937,653 B2 | 8/2005 | Song et al. |
| 7,277,483 B1 | 10/2007 | Eckart |
| 8,548,048 B2 | 10/2013 | El-Maleh et al. |
| 8,565,300 B2 | 10/2013 | Wang et al. |

(Continued)

FOREIGN PATENT DOCUMENTS

| KR | 10-2004-0047009 A | 6/2004 |
|---|---|---|
| KR | 10-2004-0071938 A | 8/2004 |
| KR | 10-2007-0023158 A | 2/2007 |

*Primary Examiner* — Obafemi Sosanya
(74) *Attorney, Agent, or Firm* — Lee & Morse, P.C.

(57) ABSTRACT

A codec according to an exemplary embodiment includes a codec processor which receives a current frame, determines a type of a received current frame, and sets rate control parameters of the current frame, and a bit-rate estimator which allocates total target bits to a first group of picture (GOP) including the current frame, and allocates a target bit to each of frames included in the first GOP based on a determined type of the current frame and set rate control parameters.

20 Claims, 12 Drawing Sheets

(56) References Cited

U.S. PATENT DOCUMENTS

2004/0114817 A1\* 6/2004 Jayant ................... H04N 19/00
382/239
2005/0031032 A1\* 2/2005 Shen ................... H04N 19/159
375/240.01

\* cited by examiner

|  | Normal Mode(NM) | Flat Mode(FM) |
|---|---|---|
| k2 | k2×1 | k2×A1(A1>1) |
| r_seq | r_seq×1 | r_seq×B1(B1<1) |

CODEC, SYSTEM ON CHIP (SOC) INCLUDING THE SAME, AND DATA PROCESSING SYSTEM INCLUDING THE SOC

CROSS-REFERENCE TO RELATED APPLICATION

Korean Patent Application No. 10-2014-0164123, filed on Nov. 24, 2014, in the Korean Intellectual Property Office, and entitled: "Codec, System on Chip (SoC) Including the Same, and Data Processing System Including the SoC," is incorporated by reference herein in its entirety.

BACKGROUND

1. Field

Embodiments relate to a codec, and particularly to a codec which can estimate a bit-rate allocated to a current group of picture (GOP) regardless of a bit-rate of a previous GOP, adjust a quantization parameter for an I-frame, and lower an amount of bits generated in the I-frame, a system on chip including the codec, and a processing system including the system on chip.

2. Description of the Related Art

As an internet protocol (IP) network is developed, a video communication over the IP network has gained great popularity. Unlike a conventional image transmission over a cable network, a number of ways for an image compression have been sought for an efficient transmission in an image transmission over the IP network. On the other hand, the image transmission of a mobile device over the IP network is more likely to have data packet loss relatively in a transmission process, such that a user has inconvenience such as disconnection of an image and deterioration of an image quality caused by a frame drop.

SUMMARY

An exemplary embodiment is directed to a codec, including a codec processor to receive a current frame, determine a type of a received current frame, and set rate control parameters of the current frame, and a bit-rate estimator to allocate total target bits to a first group of picture (GOP) including the current frame, and allocate a target bit to each of frames included in the first GOP based on a determined type of the current frame and set rate control parameters.

When a type of the current frame is an intra frame (I-frame), the bit-rate estimator may allocate total target bits to the first GOP regardless of a second GOP including a previous frame and allocate a target bit to the current frame using the total target bits allocated to the first GOP.

When a type of the current frame is not an intra frame (I-frame), the bit-rate estimator may allocate the target bit to the current frame using a difference between the number of the total target bits allocated to the first GOP and the number of bits used to encode previous frames included in the first GOP.

The bit-rate estimator may allocate the target bit to the current frame based on the number of frames included in a first GOP that are not processed.

The codec may include an encoder to encode the current frame and output an encoded current frame, and a codec memory to store the encoded current frame, wherein the codec processor is to check whether or not the codec memory is saturated based on the encoded current frame stored in the codec memory.

When the codec memory is saturated, the codec CPU may skip encoding for remaining frames included in the first GOP.

The codec may include a code rate controller to generate a quantization parameter for each of blocks included in the current frame using a saturation degree of the codec memory and rate control parameters.

The code rate controller may adjust the quantization parameter for each of the blocks included in the current frame in accordance with a determined type of the current frame and transmit the quantization parameter adjusted on a block basis to the encoder, and the encoder may encode each of the blocks included in the current frame using the quantization parameter adjusted on a block basis.

When the determined type of the current frame is an intra frame (I-frame), the code rate controller may generate a quantization parameter that is greater than a quantization parameter generated when the current frame is not an I-frame.

An exemplary embodiment is directed to a system on chip, including a pre-processing circuit to process image data, generate, and output a current frame using processed image data, and a codec to receive the current frame and encodes the current frame, wherein the codec includes a codec processor to receive a current frame, determine a type of a received current frame, and set rate control parameters of the current frame and a bit-rate estimator to allocate total target bits to a first group of picture (GOP) including the current frame, and allocate a target bit to each of frames included in the first GOP based on a determined type of the current frame and set rate control parameters.

When a type of the current frame is an intra frame (I-frame), the bit-rate estimator may allocate total target bits to the first GOP and allocate a target bit to the current frame using the total target bits allocated to the first GOP regardless of a second GOP including a previous frame.

When a type of the current frame is not an intra frame (I-frame), the bit-rate estimator may allocate the target bit to the current frame using a difference between the number of total target bits allocated to the first GOP and the number of bits used to encode previous frames included in the first GOP.

The bit-rate estimator may allocate the target bit to the current frame based on the number of frames included in a first GOP that are not processed.

The system on chip may include an encoder to encode the current frame and output an encoded current frame, and a codec memory to store the encoded current frame, wherein the codec processor is to check whether or not the codec memory is saturated based on the encoded current frame stored in the codec memory.

When the codec memory is saturated, the codec CPU may skip encoding for remaining frames included in the first GOP.

The system on chip may include a code rate controller to generate a quantization parameter for each of blocks included in the current frame using a saturation degree of the codec memory and rate control parameters.

The code rate controller may adjust the quantization parameter for each of the blocks included in the current frame in accordance with a determined type of the current frame and transmit the quantization parameter adjusted on a block basis to the encoder, and the encoder may encode each of the blocks included in the current frame using the quantization parameter adjusted on a block basis.

When the determined type of the current frame is an intra frame (I-frame), the code rate controller may generate a quantization parameter that is greater than a quantization parameter generated when the current frame is not an I-frame.

An exemplary embodiment is directed to a codec, including a codec processor to receive a current frame, determine a type of a received current frame, set rate control parameters of the current frame, and determine whether image data is to be encoded in a first mode or in a second mode, a codec memory to store image data, and a code rate controller to, when image data is to be encoded in the first mode, generate a quantization parameter for each block in the current frame using a saturation degree of the codec memory and rate control parameters, and, when image data is to be encoded in the second mode, to adjust the rate control parameters of the current frame and generate a quantization parameter for each block in the current frame using a saturation degree of the codec memory and adjusted rate control parameters.

When the determined type of the current frame is an intra frame (I-frame), the code rate controller may generate a quantization parameter that is greater than a quantization parameter generated when the current frame is not an I-frame.

The codec may include an encoder to encode each of the blocks included in the current frame using the quantization parameter output by the code rate controller.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
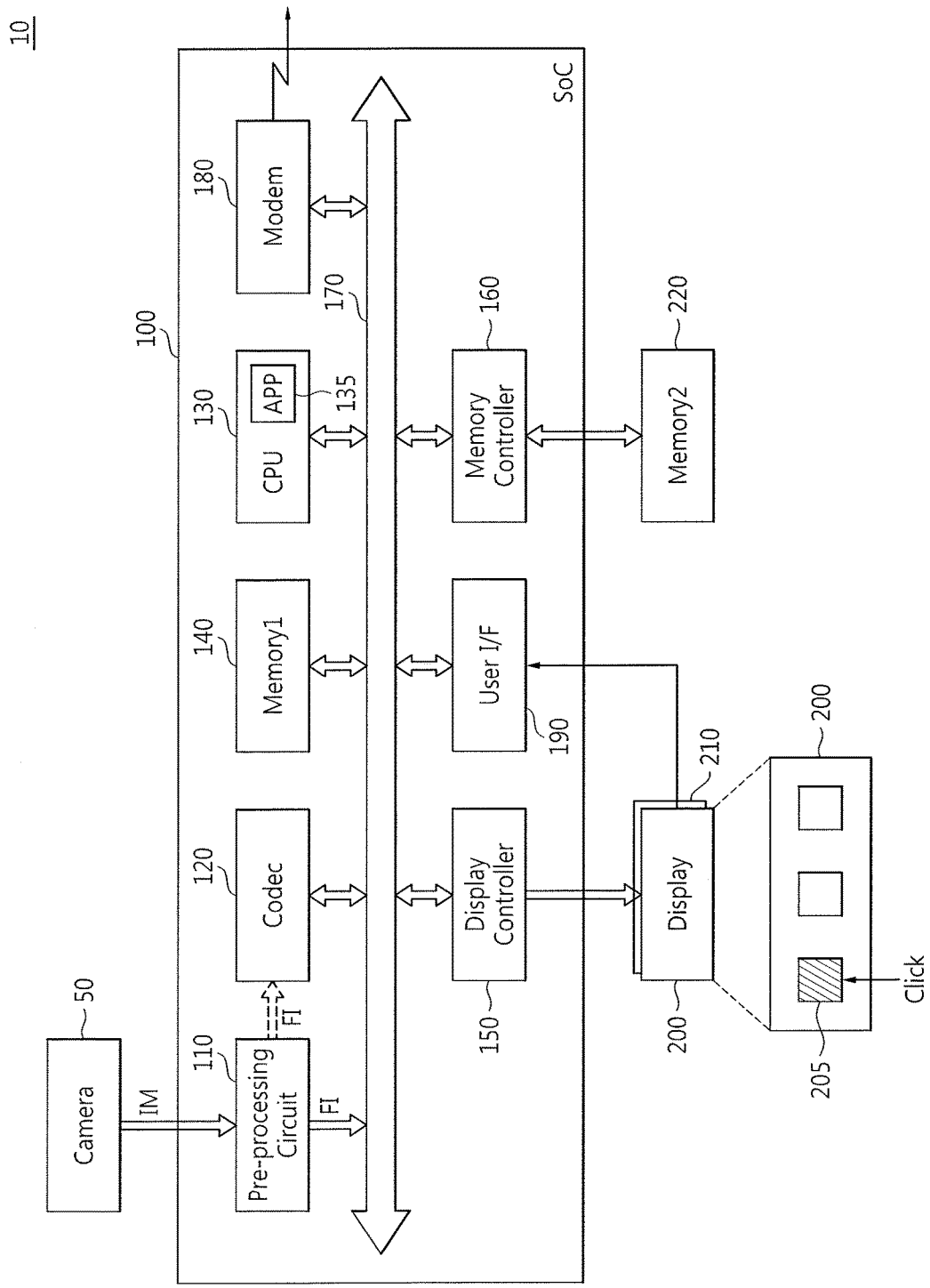
FIG. 1 illustrates a block diagram of a data processing system according to an exemplary embodiment.

FIG. 1 is a block diagram of a data processing system according to an exemplary embodiment. A data processing system 10 may be embodied in a TV, a digital TV (DTV), an internet protocol TV (IPTV), a personal computer (PC), a desk-top computer, a lap-top computer, a computer workstation, a tablet PC, a video game platform (or video game console), a server, or a mobile computing device.

The mobile computing device may be embodied in a mobile phone, a smart phone, a personal digital assistant (PDA), an enterprise digital assistant (EDA), a digital still camera, a digital video camera, a portable multimedia player (PMP), a personal navigation device or portable navigation device (PND), a mobile internet device (MID), a wearable computer, an internet of things (IoT) device, an internet of everything (IoE) device, an e-book, and so forth.

The data processing system 10 may refer to various types of devices which can process two dimensional (2D) or three dimensional (3D) graphic data, and display processed data. The data processing system 10 may include a camera 50, a system on chip (SoC) 100, a display 200, an input device 210, and a second memory 220. The second memory 220 is shown outside the SoC 100 in FIG. 1; however, the second memory 220 may be embodied in the SoC 100 according to an exemplary embodiment.

The camera 50 may be a CMOS image sensor. The camera 50 captures a subject, generates a first data IM for the subject, and outputs a generated first data IM to the SoC 100. The first data IM may be still image data or video data.

The SoC 100 may generally control an operation of the data processing system 10. For example, the SoC 100 may be to an integrated circuit (IC) which can perform operations according to an exemplary embodiment to be described in the present specification, a motherboard, an application processor (AP), a mobile AP, and so forth.

That is, the SoC 100 may process a first data IM output from the camera 50, and display processed data on the display 200, store the processed data in the second memory 220, and/or transmit the processed data to another data processing system. The data IM output from the camera 50 may be transmitted to a pre-processing circuit 110 through a mobile industry processor interface (MIPI) camera serial interface (CSI).

The SoC 100 may include the pre-processing circuit 110, a codec 120, a processor, e.g., a central processing unit (CPU) 130, a first memory 140, a display controller 150, a memory controller 160, a bus 170, a modem 180, and a user interface 190.

The pre-processing circuit 110, the codec 120, the CPU 130, the first memory 140, the display controller 150, the memory controller 160, the modem 180, and the user interface 190 may transmit or receive data to or from each other through the bus 170. For example, the bus 170 may be embodied in a Peripheral Component Interconnect Bus (PCI) bus, a PCI Express (PCIe) bus, an Advanced High Performance Bus (AMBA), an Advanced High Performance Bus (AHB), an Advanced Peripheral Bus (APB), an Advanced eXtensible Interface (AXI) bus, or a combination of these; however, the bus is not limited thereto.

The pre-processing circuit 110 may receive a first data IM output from the camera 200, process a received first data IM, and output a second data FI generated according to a result of the processing to the codec 120. For example, the pre-processing circuit 110 may transmit the second data FI generated according to a result of the processing to the codec 120 directly or through the bus 170.

Each of the first data IM and the second data FI may refer to a frame (or picture). Hereinafter, each of the data IM and FI is referred to as a current frame (or current picture) for convenience of description. According to an exemplary embodiment, the pre-processing circuit 110 may be an image signal processor (ISP). For example, the ISP may convert a first data IM having a first data format into a second data FI having a second data format. For example, the first data IM may be data having a Bayer pattern, and the second data FI may be a YUV data; however, embodiments are not limited thereto.

The pre-processing circuit 110 is in the SoC 100 in FIG. 1; however, the pre-processing circuit 110 may be outside the SoC 100 according to exemplary embodiments.

The codec 120 may perform an encoding operation (or coding) on each of a plurality of blocks included in a current frame FI. The encoding operation may be performed by using an image data encoding technology such as a joint picture expert group (JPEG), a motion picture expert group (MPEG), MPEG-2, MPEG-4, VC-1, H.264, H.265, or High Efficiency Video Coding (HEVC); however, embodiments are not limited thereto.

The codec 120 is embodied in a hardware codec in FIG. 1, e.g., may be a circuit or device configured to perform an encoding operation (or coding); however, a codec may be in a hardware codec, a software codec, a firmware codec, or a combination thereof. The software codec may be executed by the CPU 130 such that the CPU 130 may be transformed into a special-purpose processor for performing the methods described herein.

The CPU 130 may control an operation of the SoC 100. A user may provide the SoC 100 with an input so that the CPU 130 may perform one or more applications (e.g., software applications (APP) 135).

According to an exemplary embodiment, one of the applications 135 executed by the CPU 130 may be an image call application. Moreover, the applications 135 executed by the CPU 130 may include an operating system OS, a word processor application, a media player application, a video game application, and/or a graphical user interface (GUI) application; however, the applications are not limited thereto. Hereinafter, an image call application is referred to as the application 135 for convenience of description.

The first memory 140 may receive and store data encoded by the codec 120 as the application 135 is executed according to a control of a memory controller. Moreover, the first memory 140 may transmit data stored by the application 135 to the CPU 130 or the modem 180 according to a control of the memory controller.

The first memory 140 may write data for the application 135 executed by the CPU 130 and read data for the application 135 stored in the first memory 140. For example, the first memory 140 may be embodied in a volatile memory such as a static random access memory (SRAM) or a non-volatile memory such as a read only memory (ROM).

The display controller 150 may transmit data output from the codec 120 or the CPU 130 to the display 200. The display 200 may be embodied in a monitor, a TV monitor, a projection device, a thin film transistor-liquid crystal display (TFT-LCD), a light emitting diode (LED) display, an organic LED (OLED) display, an active-matrix OLED (AMOLED) display, or a flexible display. For example, the display controller 150 may transmit data to the display 200 through a MIPI display serial interface (DSI).

The input device 210 may receive a user input which is input from a user, and transmit an input signal corresponding to the user input to the user interface 190.

The input device 210 may be embodied in a touch panel, a touch screen, a voice recognizer, a touch pen, a keyboard, a mouse, a track point, and the like; however, it is not limited thereto. For example, when the input device 210 is a touch screen, the input device 210 may include a touch panel and a touch panel controller. Moreover, when the input device 210 is a voice recognizer, the input device 210 may include a voice recognition sensor and a voice recognition controller.

The input device 210 may be embodied to be connected to the display 200 or to be separated from the display 200. According to an exemplary embodiment, when a user performs an application icon 205 displayed on the display 200 using the input device 210, the input device 210 may generate an input signal.

The application icon 205 may be performed by the application 135 which can be executed by the CPU 130. A plurality of application icons may be displayed on the display 200. For example, when the application 135 is an image call application, the application icon 205 may be an icon for executing the image call application. The input device 210 may transmit an input signal to the user interface 190.

The user interface 190 may receive an input signal from the input device 210, and transmit data corresponding to the input signal to the CPU 130. According to an exemplary embodiment, the CPU 130 may receive data corresponding to an input signal and execute the image call application 135 in response to the data.

The memory controller 160 may read data stored in the second memory 220 and transmit read data to the codec 120 or the CPU 130 according to a control of the codec 120 or the CPU 130. Moreover, the memory controller 160 may write data output from the codec 120 or the CPU 130 in the second memory 220 according to a control of the codec 120 or the CPU 130.

The second memory 220 may be embodied in a volatile memory and/or a non-volatile memory. The volatile memory may be embodied in a random access memory (RAM), a static RAM (SRAM), a dynamic RAM (DRAM), a synchronous DRAM (SDRAM), a thyristor RAM (T-RAM), a zero capacitor RAM (Z-RAM), or a Twin Transistor RAM (TTRAM).

The non-volatile memory may be embodied in an electrically erasable programmable read-only memory (EEPROM), a flash memory, a magnetic RAM (MRAM), a spin-transfer torque MRAM, a ferroelectric RAM (FeRAM), a phase change RAM (PRAM), or a resistive RAM (RRAM).

In addition, the non-volatile memory may be embodied in a multimedia card (MMC), an embedded MMC (eMMC), a universal flash storage (UFS), a solid state drive or solid state disk (SSD), a USB flash drive, or a hard disk drive (HDD).

The modem 180 may output data encoded by the codec 120 or the CPU 130 to the outside using a radio communication technology. The radio communication technology may refer to WI-FI, WIBRO, 3G radio communication, long term evolution (LTE), long term evolution-advanced (LTE-A), or broadband LTE-A.

Figure 2:
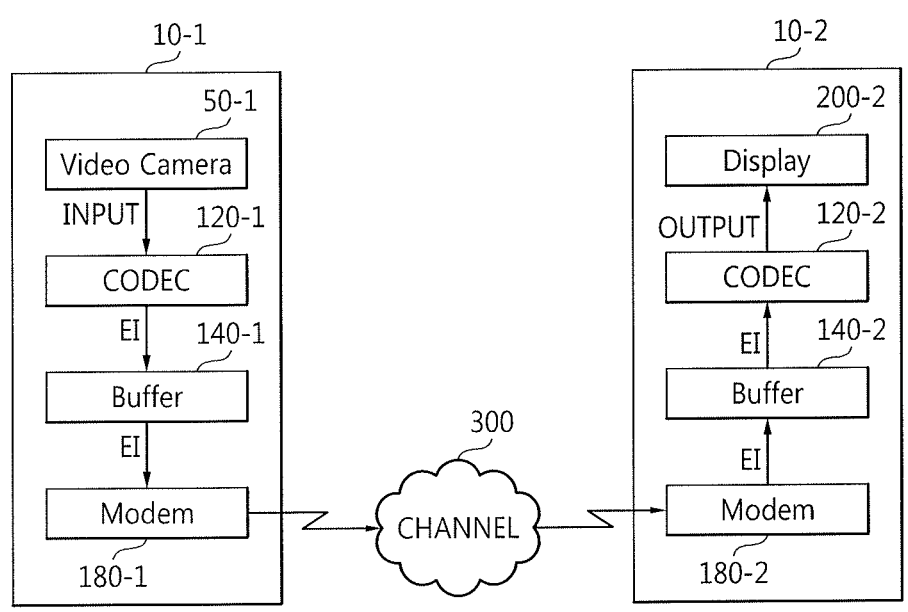
FIG. 2 illustrates a block diagram of an image communication system which includes the data processing system shown in FIG. 1.

FIG. 2 is a block diagram of an image communication system which includes the data processing system shown in FIG. 1. Referring to FIG. 2, an image communication system 20 may include a first data processing system 10-1 and a second data processing system 10-2 which can communicate with each other through a channel 300. The image communication system 20 may refer to an image call system.

The first data processing system 10-1 and the second data processing system 10-2 have substantially the same or similar structure and operation. The first data processing system 10-1 may include a video camera 50-1, a codec 120-1, a buffer 140-1, and a modem 180-1.

The first data processing system 10-1 may encode data INPUT received from the video camera 50-1 and transmit encoded data EI to the second data processing system 10-2 through the channel 300. The video camera 50-1 may be substantially the same as the camera 50 shown in FIG. 1, the codec 120-1 may be substantially the same as the codec 120 shown in FIG. 1, the buffer 140-1 may be substantially the same as the first memory 140 shown in FIG. 1, and the modem 180-1 may be substantially the same as the modem 180 shown in FIG. 1.

The second data processing system 10-2 may receive the encoded data EI transmitted from the first data processing system 10-1 through the channel 300. The second data processing system 10-2 may include a display 200-2, a codec 120-2, a buffer 140-2, and a modem 180-2. The modem 180-2 may transmit the encoded data EI transmitted from the first data processing system 10-2 to the buffer 140-2. The modem 180-2 may be substantially the same as the modem 180 shown in FIG. 1.

The buffer 140-2 may receive the encoded data EI from the modem 180-2, and transmit the encoded data EI to the codec 120-2. The buffer 140-2 may be substantially the same as the first memory 140 shown in FIG. 1. The codec 120-2 may receive the encoded data EI and decode the encoded data EI. For example, the codec 120-2 may include a function of a decoder.

The display 200-2 may display the data decoded by the codec 120-2. The display 200-2 may be substantially the same as the display 200 shown in FIG. 1. The first data processing system 10-1 and the second data processing system 10-2 may perform bi-directional communication through the channel 300. According to exemplary embodiments, the channel 300 may support WI-FI, WIBRO, 3G radio communication, long term evolution (LTE), long term evolution-advanced (LTE-A), or broadband LTE-A.

Figure 3:
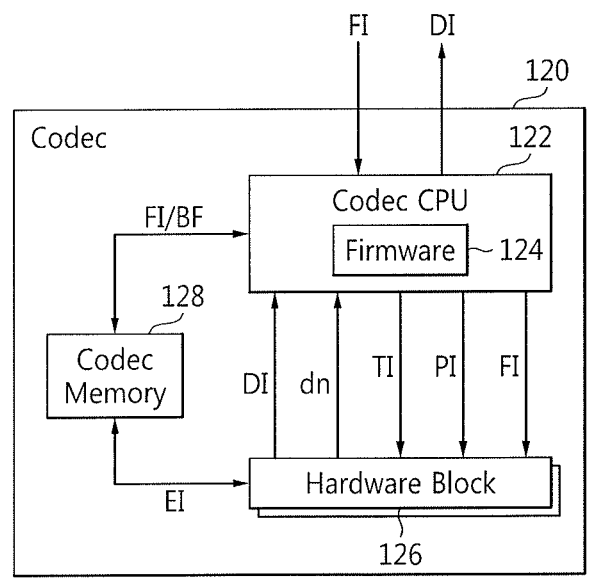
FIG. 3 illustrates a schematic block diagram of a codec shown in FIGS. 1 and 2.

FIG. 3 is a schematic block diagram of a codec shown in FIGS. 1 and 2. Referring to FIGS. 1 to 3, the codec 120 may include a codec CPU 122, a hardware block 126, and a codec memory 128. The codec CPU 122 may store a current frame FI output from the pre-processing circuit 110 in the codec memory 128.

The codec CPU 122 may determine a type of the current frame FI and generate type information TI using a determined type of the current frame FI. The codec CPU 122 may determine rate control parameters of the current frame FI, and generate parameter information PI using determined rate control parameters. The rate control parameter may refer to parameters which can adjust or control a bit-rate of the current frame FI.

The codec CPU 122 may output the type information TI, the parameter information PI, and the current frame FI to the hardware block 126. The firmware 124, performed by the codec CPU 122, may determine whether the current frame FI is an i-frame, a p-frame, or a b-frame according to property of a group of picture (GOP), and generate type information TI according to a result of the determination.

According to exemplary embodiments, a group of picture (GOP) may include at least one of the i-frame, the b-frame, and the p-frame. For example, a first frame of frames included in the GOP is the i-frame, and all of the remaining frames may be the i-frame, the b-frame, and/or the p-frame. According to exemplary embodiments, the number of frames included in the GOP and/or an order of frames in different types transmitted from the pre-processing circuit 110 may be variously changed. The firmware 124 performed by the codec CPU 122 may determine the rate control parameters of a current frame FI, and generate parameter information PI according to a result of the determination.

The rate control parameters of a current frame FI may include complexity depending on a type of each of frames, a size of a GOP (for example, total target bits for a GOP), the number of frames per second (or picture per second) corresponding to a frame-rate, the number of bits per second corresponding to a bit-rate, a normalization constant, and/or an initial parameter. The initial parameter may include a first constant k2, a second constant r-seq, an initial frame quantization parameter, and an initial buffer saturation degree d0. The codec CPU 122 may calculate complexity of a current frame FI for each GOP.

The codec CPU 122 may calculate complexity xi, xp, or xb of a current frame FI using Equation 1.

$$xi=160*(br)/115, xp=60*(br)/115, \text{ and } xb=42*(br)/115 \quad \text{[Equation 1]}$$

Here, xi represents a complexity when the current frame FI is an i-frame, xp represents a complexity when the current frame FI is a p-frame, xb represents a complexity when the current frame FI is a b-frame, and br represents a bit-rate of the current frame FI or the number of bits per second. For example, the codec CPU 122 may determine a bit-rate br, and determine a complexity xi of the i-frame, a complexity xp of the p-frame, and/or a complexity xb of the b-frame using a determined bit-rate.

For example, when the bit-rate is 115, xi is 160, xp is 60, and xb is 42.

The parameter information PI may include the rate control parameters of a current frame FI. For example, parameter information PI may include a complexity xi, xp, or xb of the current frame FI, a GOP size, the number of bits per second, and/or the number of frames per second.

The codec CPU 122 may transmit an encoding (or coding) end signal DI for a current frame FI output from the hardware block 126 to the pre-processing circuit 110.

The codec CPU 122 may check whether or not the codec memory 128 is saturated, and generate a check signal BF corresponding to a result of the check. The hardware block 126 may encode a current frame FI using type information TI and parameter information PI transmitted from the codec CPU 122. The hardware block 126 may store the encoded current frame EI in the codec memory 128. The hardware block 126 may transmit an encoding (or coding) end signal DI to the codec CPU 122 when encoding (or coding) for the current frame FI is ended.

The codec memory 128 may receive and store the encoded current frame EI transmitted from the hardware block 126. The codec memory 128 may include a plurality of buffers and/or a plurality of virtual buffers. According to exemplary embodiments, the codec memory 128 may be embodied in a volatile memory or a non-volatile memory.

Figure 4:
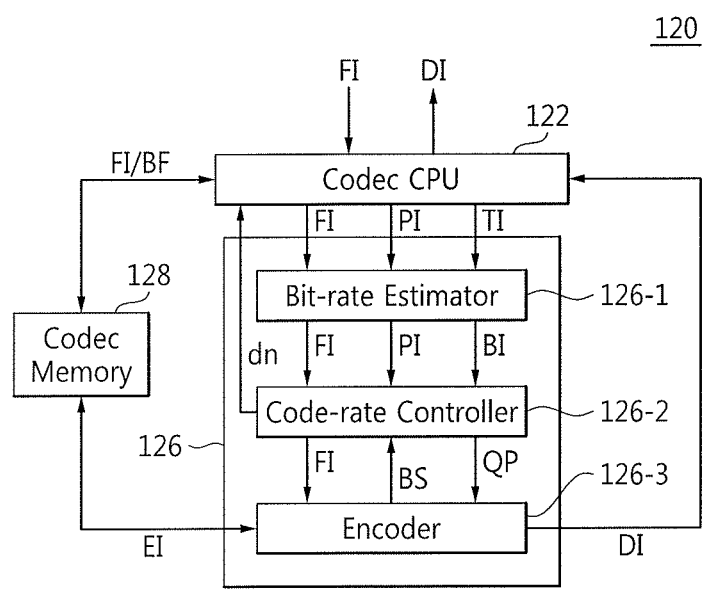
FIG. 4 illustrates a detailed block diagram of the codec shown in FIG. 3.

FIG. 4 is a detailed block diagram of the codec shown in FIG. 3. Referring to FIGS. 3 and 4, the codec 120 may include the codec CPU 122, the hardware block 126, and the codec memory 128. The hardware block 126 may include a bit-rate estimator 126-1, a code-rate controller 126-2, and an encoder 126-3.

The bit-rate estimator 126-1 may allocate a target bit to a current frame FI using the type information TI and the parameter information PI transmitted from the codec CPU 122. The target bit may refer to the number (or bit capacity) of bits allocated for encoding (or coding) the current frame FI by the bit-rate estimator 126-1.

According to an exemplary embodiment, the bit-rate estimator 126-1 may allocate total target bits to a GOP including a current frame FI, and allocate a target bit to each of frames included in the GOP using type information TI and parameter information PI of the current frame FI.

The bit rate estimator 126-1 may then transmit bit information BI, which may include a target bit of the current frame FI, and include total target bits allocated to a first GOP GOP1 including the current frame FI, to the code rate controller 126-2. Moreover, the bit information BI may include a target bit of each of frames included in the first GOP GOP1.

The code-rate controller 126-2 may then determine a quantization parameter QP for each of blocks included in a current frame FI using the target bits allocated to each of frames by the bit-rate estimator 126-1, the parameter information PI, and a number of bits actually used to encode a previous block. The code-rate controller 126-2 may then output the quantization parameter QP or an adjusted quantization parameter QP' depending on the type information to the encoder 126-3.

The encoder 126-3 may then encode the current frame FI, output a number of bits BS actually used in the encoding, output the encoded frame EI to the codec memory 128, and output an encoding end signal DI to the codec CPU 122 when encoding for a current frame FI is ended. The code-rate controller 126-2 may calculate the buffer saturation degree dn of an $n^{th}$ block in accordance with the number of bits BS and may output the buffer saturation degree dn to the codec CPU 122.

Figure 5:
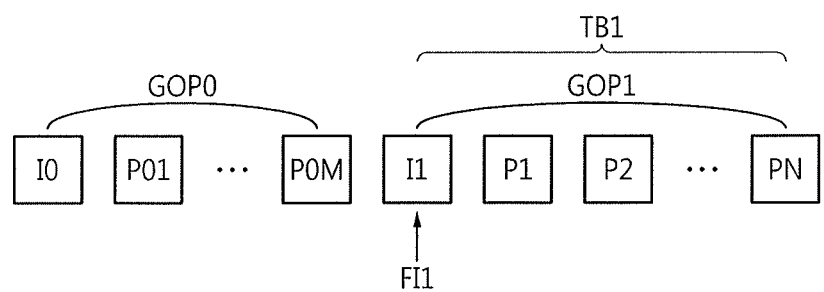
FIG. 5 illustrates a block diagram which describes a method in which a bit-rate estimator of FIG. 4 allocates a target bit to a group of picture (GOP) when a current frame is an I-frame.

FIG. 5 is a block diagram which describes a method in which the bit-rate estimator of FIG. 4 allocates a target bit to a group of picture (GOP) when a current frame is an I-frame. Referring to FIGS. 4 and 5, when type information TI of a current frame FI=FI1=I1 represents an i-frame, the bit-rate estimator 126-1 may allocate total target bits TB1 to a first GOP GOP1 regardless of a target bit of a second GOP GOP0 including a previous frame.

According to an exemplary embodiment, when a target bit allocated to the second GOP GOP0 is different from a target bit used when actually encoding (or coding) the second GOP GOP0, the bit-rate estimator 126-1 may allocate total target bits TB1 to the first GOP GOP1 regardless of a difference in target bit generated in the second GOP GOP0. That is, the bit-rate estimator 126-1 may allocate total target bits TB1 to all of an i-frame I1 and P-frames P1 to PN, where N is a natural number of two or more). The bit-rate estimator 126-1 may calculate the total target bits TB1 of the first GOP GOP1 using Equation 2.

$$TB=K*br/f \quad \text{[Equation 2]}$$

Here, TB represents total target bits TB1 of a first GOP GOP1 including a current frame F1, K represents a size of the first GOP GOP1, br represents a bit-rate of the current frame FI, and f represents a frame-rate or picture-rate. For example, when the bit-rate br is 300, the size K of the first GOP GOP1 is 30, and the number of frames is 30, total target bits TB is 300. Moreover, when the bit-rate br is 300, the size K of the first GOP GOP1 is 300, and the number of frames f is 30, the total target bits TB is 3000.

The bit-rate estimator 126-1 may allocate a target bit to a current frame FI or FI1 using estimated total target bits TB1 of the first estimated GOP GOP1. For example, the bit-rate estimator 126-1 may allocate or calculate a target bit ETB to the current frame FI or FI1 using Equation 3.

$$ETB=[(xL/kL)/(xi/ki+Np*xp/kp+Nb*xb/kb)]*R \quad \text{[Equation 3]}$$

Here, xL represents a complexity of an $L^{th}$ frame, where L is a natural number, xi represents a complexity of an i-frame, xp represents a complexity of a p-frame, xb represents a complexity of a b-frame, kn represents a normalization constant of a $n^{th}$ frame, ki represents a normalization constant (ki=1) of the i-frame, kp represents a normalization constant (kp=1) of the p-frame, kb represents a normalization constant (kb=1.4) of the b-frame, Np represents the number of p-frames which are not processed in a GOP, Nb represents the number of b-frames which are not processed in the GOP, and R represents the number of bits not used during encoding the GOP, i.e., remaining bits assigned to the GOP. In other words, the target bit for each frame in the GOP may be assigned based on a ratio of the complexity of the Lth frame to the total complexity of remaining n- and b-frames in the GOP plus the complexity of an i-frame (such that this ratio will be one when only i-frames remain).

Figure 6:
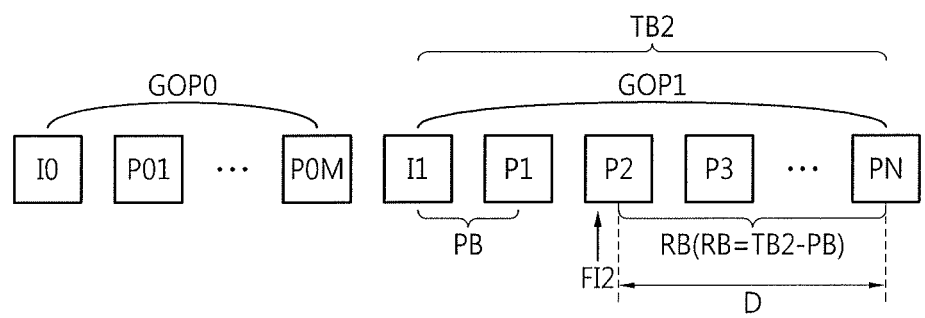
FIG. 6 illustrates a block diagram which describes a method in which the bit-rate estimator of FIG. 4 allocates a target bit to a GOP when a current frame is not an I-frame.

FIG. 6 is a block diagram which describes a method in which the bit-rate estimator of FIG. 4 allocates a target bit to a GOP when a current frame is not an I-frame. Referring to FIGS. 4 and 6, when type information TI of a current frame FI=FI2=P2 represents a current frame is not an i-frame, the bit-rate estimator 126-1 already allocates total target bits to a first GOP GOP1 when the current frame FI is the i-frame, such that the bit-rate estimator does not allocate total target bits TB2 to the first GOP GOP1.

According to an exemplary embodiment, the bit-rate estimator 126-2 may allocate a target bit to a current frame FI, FI2, or P2 using a difference RB between the number of the total target bits TB2 allocated to the first GOP GOP1 and the number PB of bits used to encode (or code) previous frames I1 and P1 included in the first GOP GOP1. The difference between the number of the total target bits TB2 allocated to the first GOP GOP1 and the number of bits PB used to encode the previous frames I1 and P1 included in the first GOP GOP1 can be expressed as the number RB of remaining bits.

The bit-rate estimator 126-1 may allocate a target bit to a current frame FI, FI2, or P2 based on the number of frames included in the first GOP GOP1 and are not processed. For example, the number D of frames not processed is 28 when a current frame FI, FI2, or P2 is a p-frame, and the number of total p-frames is 29.

The bit-rate estimator 126-1 may calculate a target bit for a current frame FI, FI2, or P2 using Equation 3. The bit-rate estimator 126-1 may transmit bit information BI including the target bit of a current frame FI to the code-rate controller 126-2. Moreover, the bit-rate estimator 126-1 may transmit parameter information PI and a current frame FI to the code-rate controller 126-2.

The bit information BI may include a target bit of the current frame FI, and include total target bits allocated to a first GOP GOP1 including the current frame FI. Moreover, the bit information BI may include a target bit of each of frames included in the first GOP GOP1.

The code rate controller 126-2 may adjust rate control parameters of the current frame FI based on received parameter information PI. The code rate controller 126-2 may generate a quantization parameter QP for each of blocks included in the current frame FI using the target bit allocated to each of frames by the bit-rate estimator 126-2 and adjusted parameters.

Figure 7:
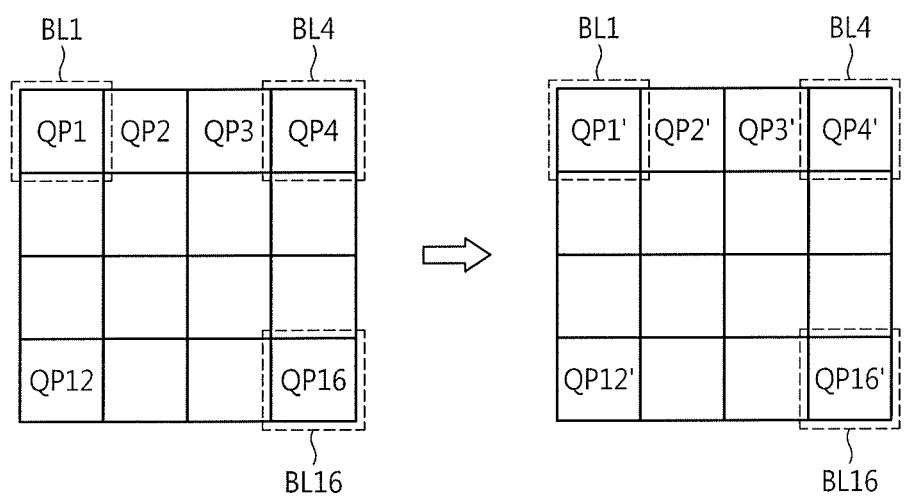
FIG. 7 illustrates a block diagram which describes a method in which a code-rate controller of FIG. 4 adjusts a quantization parameter.

FIG. 7 is a block diagram which describes a method in which the code rate controller of FIG. 4 adjusts a quantization parameter. Referring to FIGS. 4 and 7, the code rate controller 126-2 may generate a quantization parameter (e.g., QP, QP1, or QP1') for each of blocks included in a current frame FI. For example, it is assumed that the current frame FI includes 4*4 blocks. The number of blocks included in the current frame is not limited thereto. The current frame FI may include 16 blocks BL1 to BL16, and the code rate controller 126-2 may generate each of quantization parameters QP1 to QP16 for each of the blocks BL1 to BL16.

According to an exemplary embodiment, the code rate controller 126-2 may generate a quantization parameter QP1 for a first block BL1. The code rate controller 126-2 may adjust the quantization parameter QP1 for a first block BL1, and generate an adjusted quantization parameter QP1'.

The code rate controller 126-2 may transmit a quantization parameter QP=QP1' to QP16' adjusted for each of the blocks included in the current frame FI to the encoder 126-3. The code code-rate controller 126-2 may calculate a quantization parameter QP for each of blocks using Equation 4.

$$QP=(k2/31)*dn/r\_seq \qquad \text{[Equation 4]}$$

Here, k2 represents a first constant, r_seq represents a second constant, and dn represents a buffer saturation degree. The constants k2 and r_seq may be included in rate control parameters for a current frame.

Figures 8, 9:
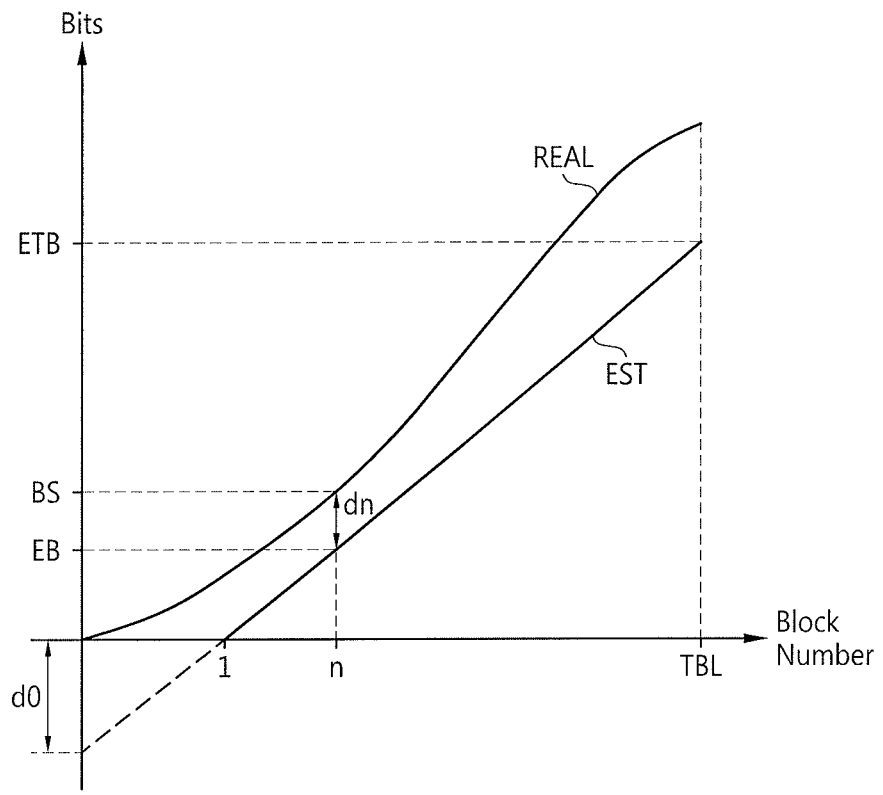
FIG. 8 illustrates a graph which describes a buffer saturation degree of a block for adjusting the quantization parameter of FIG. 7.
FIG. 9 illustrates a table which describes a method of adjusting the quantization parameter of FIG. 7.

FIG. 8 is a graph which describes a buffer saturation of a block for adjusting the quantization parameter of FIG. 7. Referring to FIGS. 4, 7, and 8, EST represents a function of a target bit allocated to each block included in a current frame, and REAL represents a function of the number of bits actually used for each of the blocks included in the current frame. dn represents a buffer saturation degree of a $n^{th}$ block included in a current frame.

The code-rate controller 126-2 may receive the number BS of bits actually used to encode (or code) a previous block ($(n-1)^{th}$ block) from the encoder 126-3 so as to calculate a buffer saturation degree dn of a $n^{th}$ block. The code-rate controller 126-2 may calculate the buffer saturation degree dn of a current block (e.g., $n^{th}$ block), using Equation 5.

$$dn=d0+BS-(ETB/TBL)*(n-1) \qquad \text{[Equation 5]}$$

Here, d0 represents an initial buffer saturation degree, EB represents a target bit allocated to encode (or code) a previous block, BS is the number of bits used to encode (or code) the previous block, ETB represents total target bits allocated for encoding (or coding) a current frame FI, TBL represents the number of total blocks included in the current frame FI, and n represents an order of a current block included in the current frame. That is, the buffer saturation degree do refers to a difference between the number BS of bits actually used in a previous block and a target bit EB allocated in the previous block.

FIG. 9 is a table which describes a method of adjusting the quantization parameter of FIG. 7. Referring to FIGS. 4, 7, and 9, k2 and r_seq may be included in rate control parameters for a current frame FI. Accordingly, the codec CPU 122 may determine a k2 value and a r_seq value. According to an exemplary embodiment, k2 and r_seq are constant values.

The code rate controller 126-2 may adjust a constant k2 and a constant r_seq, and adjust a quantization parameter QP or QP1 to QP16 using adjusted k2 and adjusted r_seq. According to an exemplary embodiment, the code-rate controller 126-2 may maintain the constant k2 and r_seq values as they are in a normal mode (NM).

The code-rate controller 126-2 may multiply the k2 value and A1(A1>1), and multiply the r_seq value and B1(B1<1) in a flat mode (FM). That is, the code rate controller 126-2 may increase the k2 value by multiplying the k2 value and a value greater than one. Moreover, the code-rate controller 126-2 may decrease the r_seq value by multiplying the r_seq value and a value less than one.

A normal mode NM may refer to a mode in which the code-rate controller 126-2 does not adjust k2 and r_seq, and a flat mode FM may refer to a mode in which the code-rate controller 126-2 adjusts k2 and r_seq.

The code-rate controller 126-2 may calculate adjusted quantization parameter QP or QP1' to QP16' using Equation 4. The code-rate controller 126-2 may transmit the adjusted quantization parameter QP or QP1' to QP16' for each of blocks included in a current frame FI to the encoder 126-3.

The encoder 126-3 may encode (or code) the current frame FI on a block basis using the quantization parameter QP=QP1 to QP16. Moreover, the encoder 126-3 may encode (or code) the current frame FI on a block basis using the adjusted quantization parameter QP=QP1' to QP16'. According to an exemplary embodiment, the encoder 126-3 may encode (or code) the current frame FI on a block basis in the normal mode NM using quantization parameter QP=QP1 to QP16 which are not changed. The encoder 126-3 may encode (or code) the current frame FI on a block basis using changed quantization parameter QP=QP1' to QP16'.

The encoder 126-3 may transmit an encoding end signal DI to the codec CPU 122 when encoding for a current frame FI is ended. The encoding end signal DI may include information on the number of bits used while the current frame FI is encoded by the encoder 126-3. The encoder 126-3 may output an encoded current frame EI to the codec memory 128 when encoding (or coding) for the current frame FI is ended.

Figure 10A:
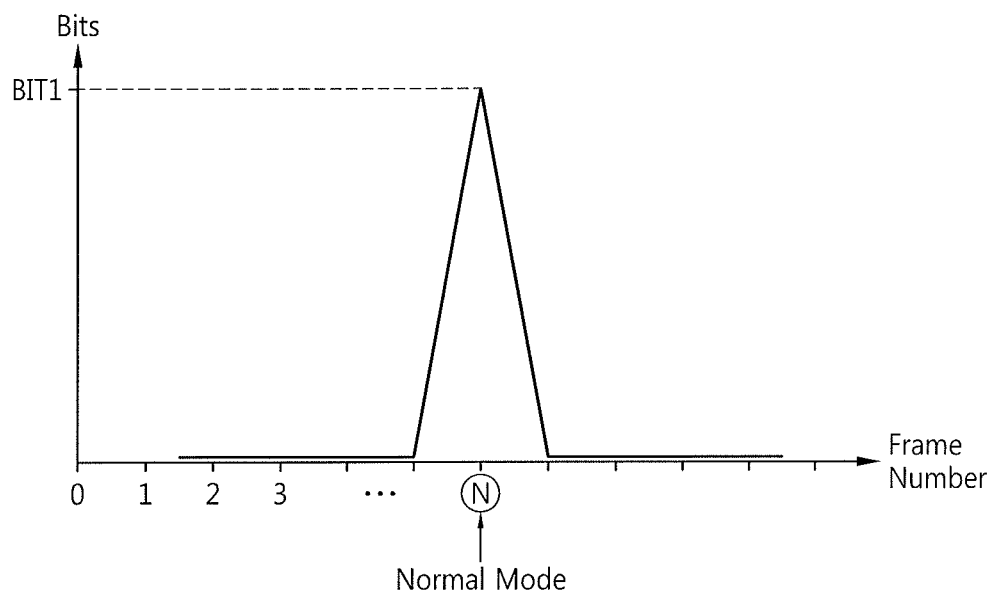
FIG. 10A illustrates a graph which shows a target bit for a frame encoded in a normal mode by an encoder of FIG. 4.

FIG. 10A is a graph which shows the number of bits for a frame encoded by an encoder of FIG. 4 in a normal mode. A graph of FIG. 10A shows the number of bits BIT1 used to encode a current frame (e.g., $n^{th}$ frame) in the normal mode. According to an exemplary embodiment, when the current frame (e.g., $n^{th}$ frame) is an i-frame, the graph of FIG. 10A may show the number of bits BIT1 used to encode the current frame.

Figure 10B:
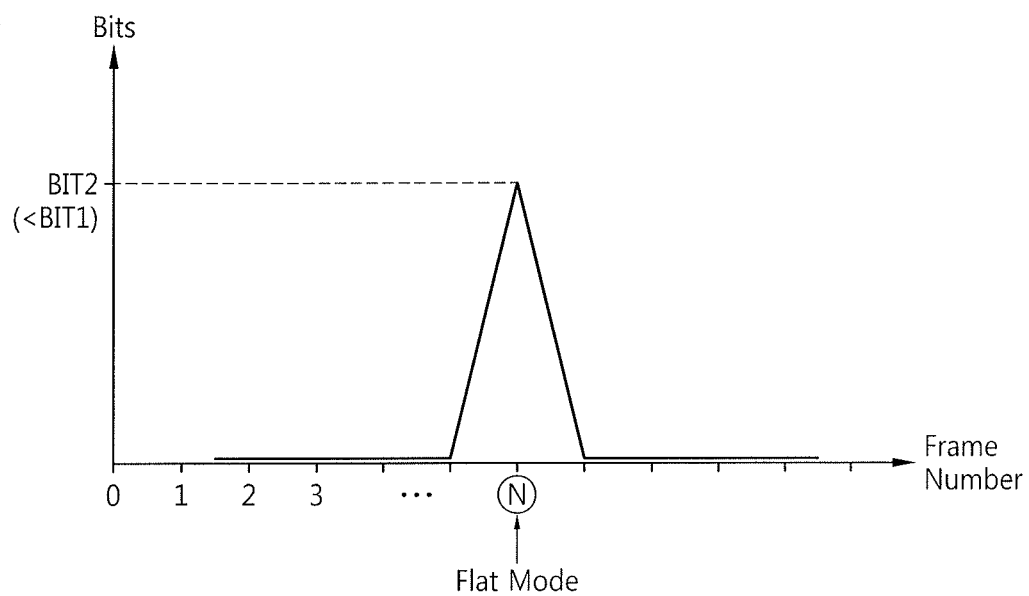
FIG. 10B illustrates a graph which shows a target bit for a frame encoded in a flat mode by the encoder of FIG. 4.

FIG. 10B is a graph which shows the number of bits for a frame encoded by the encoder of FIG. 4 in a flat mode. Referring to FIG. 10B, a graph of FIG. 10B shows the number of bits (BIT2<BIT1) used to encode a current frame (e.g., $n^{th}$ frame) in the flat mode. According to an exemplary embodiment, when the current frame (e.g., $n^{th}$ frame) is an i-frame, the graph of FIG. 10B may show the number of bits BIT2 used to encode the current frame.

Referring to FIGS. 10A and 10B, the number of bits needed to encode a current frame in the normal mode is more than the number of bits needed to encode a current frame in the flat mode. That is, the number of bits needed to encode a current frame FI is considerably decreased in the flat mode.

Figure 11:
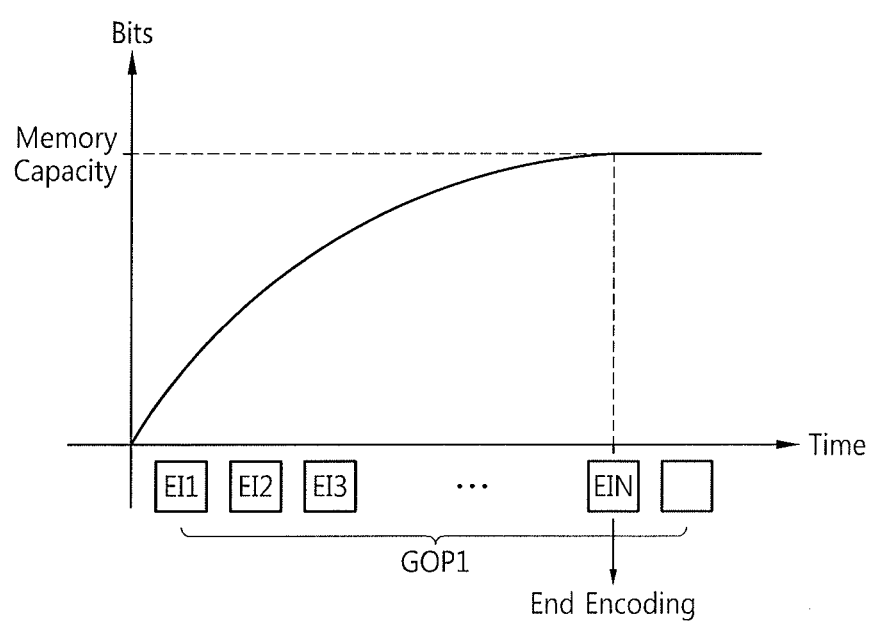
FIG. 11 illustrates a graph which describes an operation of a codec when a codec memory of FIG. 4 is saturated.

FIG. 11 is a graph which describes an operation of a codec when the codec memory of FIG. 4 is saturated. Referring to FIGS. 4 and 11, the codec CPU 122 may check whether or not the codec memory 128 is saturated and generate a check signal BF based on an encoded current frame EI stored in the codec memory 128. When the number of bits of the encoded frames stored in the codec memory 128 reaches a memory capacity allocated to a GOP including the current frame FI, the codec CPU 128 may end encoding for the current frame FI.

According to an exemplary embodiment, the codec CPU 122 may compare the number of total target bits allocated to the GOP including the current frame FI with the number of total bits of coded (or encoded) frames EI1 to EI1N of the GOP stored in the codec memory 128.

When the codec memory 128 is saturated, the codec CPU 122 may end encoding for remaining frames included in the GOP, i.e., the remaining frames are not processed at this time. For example, the codec CPU 128 may skip encoding for remaining frames until a saturation degree of the codec memory 128 falls below a predetermined amount. The predetermined amount may be determined by a user's setting or a standard set in advance. Moreover, the codec CPU 128 may transmit an encoding end signal DI to the pre-processing circuit 110. When the codec memory 128 is not saturated, the codec CPU 122 may continuously perform encoding on remaining frames included in a GOP that had not been processed.

Figure 12:
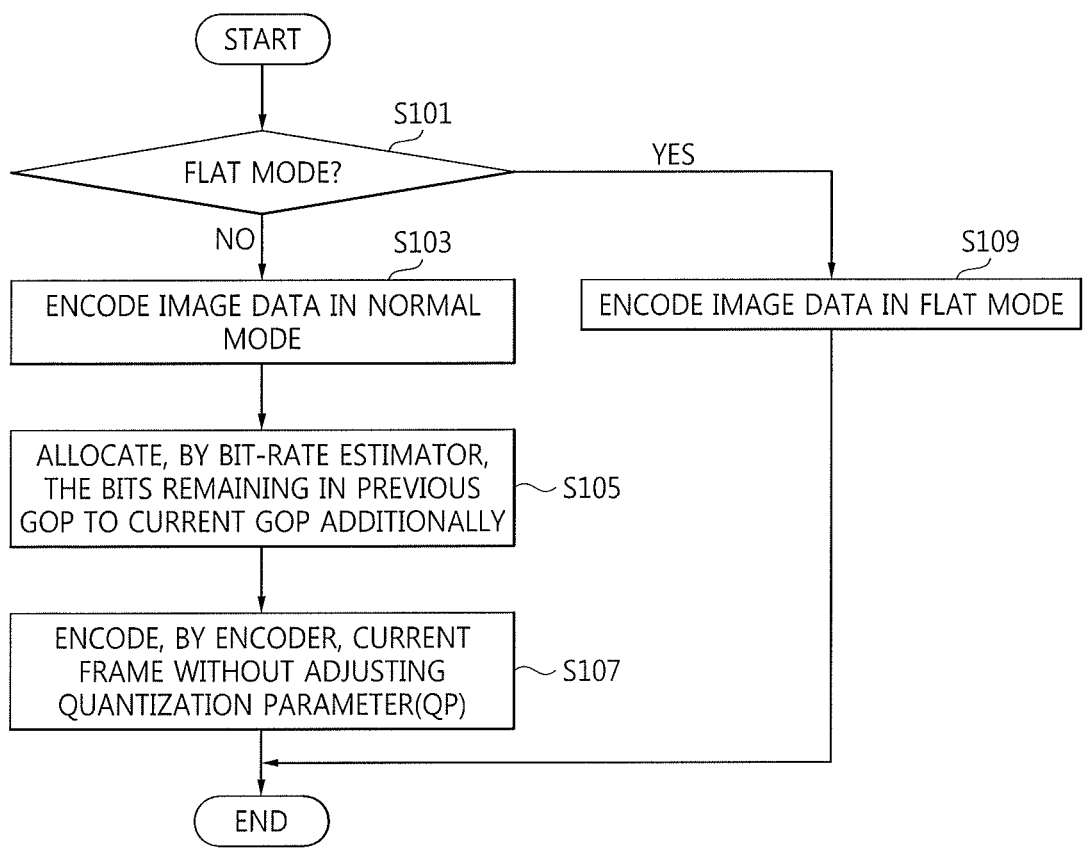
FIG. 12 illustrates a flowchart which describes a normal mode and a flat mode according to an exemplary embodiment.

FIG. 12 is a flowchart which describes a normal mode and a flat mode according to an exemplary embodiment. Referring to FIGS. 1, 4, and 12, the codec CPU 122 may determine whether to perform encoding on a current frame FI in the flat mode or in the normal mode (S101). The CPU 130 may transmit a result of the determination to the codec CPU 122.

When it is determined that encoding for a current frame FI is performed in a normal mode (No in S101), the codec CPU 122 encodes the current frame FI in the normal mode (S103). The bit-rate estimator 126-1 may allocate total target bits to a GOP including the current frame FI using the number of the bits remaining after performing encoding in a GOP including a previous frame (S105). For example, the number of the bits remaining in the GOP including a previous frame may be additionally allocated to the total target bits of the GOP including a current frame FI (S105).

The code rate controller 126-2 may not adjust a quantization parameter QP, but transmit the quantization parameter QP of each of blocks included in the current frame FI, which is not adjusted, to the encoder 126-3. The encoder 126-3 may encode a current frame FI using the quantization parameter QP which is not adjusted (S107).

When it is determined that encoding for a current frame FI is performed in a flat mode (Yes in S101), the codec CPU 122 may encode a current frame FI in the flat mode (S109).

Figure 13:
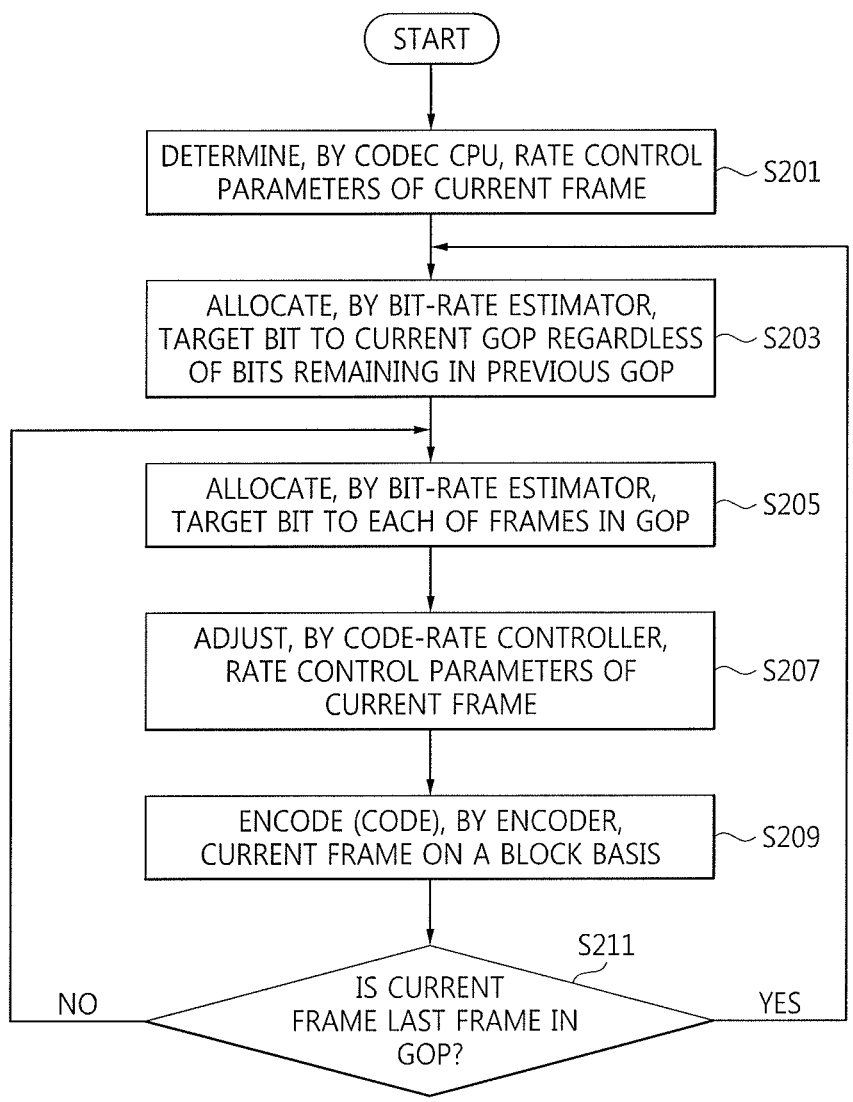
FIG. 13 illustrates a flowchart which describes an operation of a codec in a flat mode according to an exemplary embodiment.

FIG. 13 is a flowchart which describes an operation of a codec in a flat mode (S109) according to an exemplary embodiment. Referring to FIGS. 4 and 13, the codec CPU 122 may determine rate control parameters of a current frame FI (S201).

The bit-rate estimator 126-1 may allocate total target bits to a GOP including a current frame FI regardless of the number of the bits remaining after performing encoding in a previous GOP including a previous frame, when the current frame FI is an I-frame (S203). The bit-rate estimator 126-1 may allocate a target bit to each of frames included in the GOP including a current frame FI (S205).

The code-rate controller 126-2 may adjust rate control parameters of the current frame FI, and adjust a quantization parameter QP for each block of the current frame FI (S207). The code-rate controller 126-2 may transmit an adjusted quantization parameter QP' to the encoder 126-3.

The encoder 126-3 may encode the current frame FI on a block basis using the adjusted quantization parameter (S209). The encoder 126-3 may transmit an encoding end signal DI to the codec CPU 122 when encoding (or coding) for the current frame FI is ended.

The codec CPU 122 may determine whether or not a current frame is a last frame of a GOP (S211). For example, when a next frame of the current frame FI is an i-frame, the current frame FI may be a last frame of the GOP.

When the current frame FI is a last frame of the GOP, the bit-rate estimator 126-1 may allocate total target bits to a new GOP including a next frame. When the current frame FI is not a last frame of the GOP, the bit-rate estimator 126-1 may estimate a target bit of a next frame without allocating total target bits to the GOP.

Figure 14:
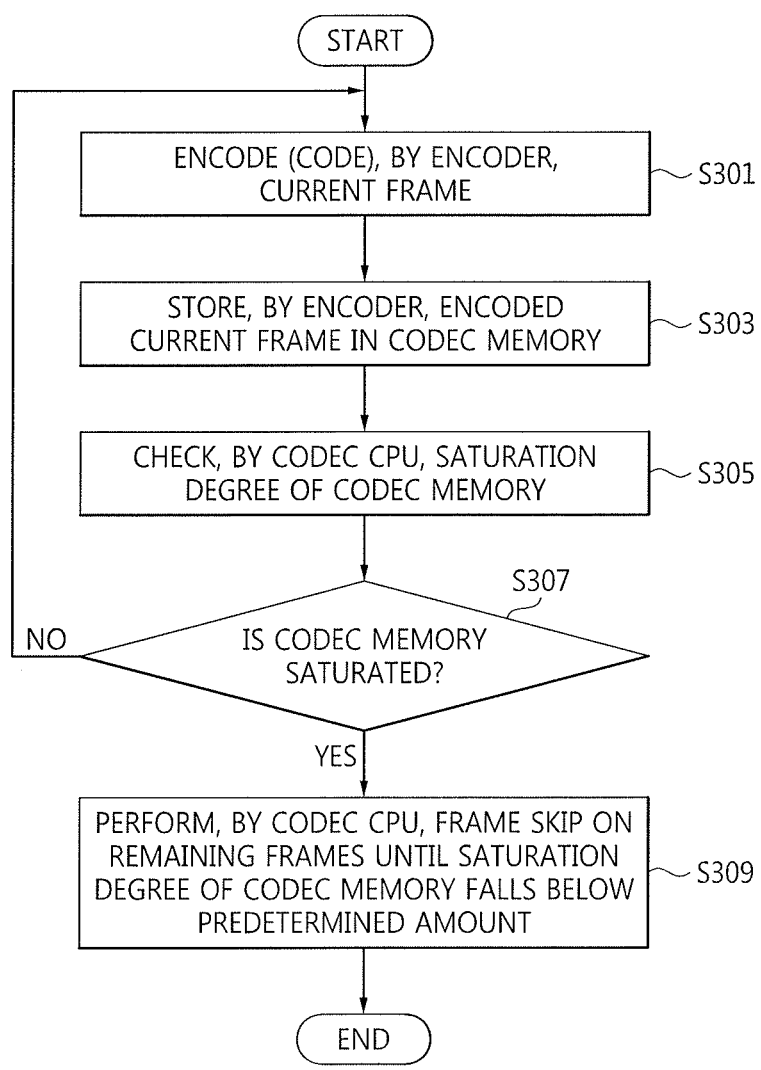
FIG. 14 illustrates a flowchart which describes an operation of a codec when a codec memory is saturated.

FIG. 14 is a flowchart which describes an operation of a codec when a codec memory is saturated. Referring to FIGS. 4 and 14, the encoder 126-3 may encode a current frame FI (S301). The encoder 126-3 may store an encoded current frame EI in the codec memory 128 when encoding for the current frame FI is ended (S303).

The codec CPU 122 may check whether or not the codec memory 128 is saturated and generate a check signal BF (S305). The codec CPU 122 may compare the number of bits of encoded frames stored in the codec memory 128 with the number of total target bits which can be stored in a memory space of the codec memory 128 allocated to a GOP, and check whether or not the codec memory is saturated according to a result of the comparison (S307).

When the codec memory 128 is not saturated, the encoder 126-3 may encode a next frame of a current frame FI (S307). When the codec memory 128 is saturated, the codec CPU 122 may skip encoding for the next frame (S307). The codec CPU 122 may skip encoding for frames remaining until a saturation degree of the codec memory 128 falls below a predetermined amount (S309). Once the codec memory 128 is no longer saturated, the method may return to S301 to encode remaining frame(s).

By way of summation and review, when compressing an image with less motion, e.g., when using an image generated by a mobile device, more skip modes are generated, resulting in more compressed P-frames, thereby generated more bits for the P-frames than for an I-frame. In this case, a transmission of a compressed I-frame exceeds a buffer limit of a receiving terminal, and thereby a frame drop may occur.

In contrast, embodiments provide a codec which can adjust a bit-rate so as to allocate a low bit-rate to a frame to which a lot of bits are allocated, and encode the frame, a system on chip including the codec, and a data processing system including the system on chip, reducing frame drop. A codec and devices having the codec according to an exemplary embodiment can encode an I-frame by limiting an amount of encoded bits of the I-frame. Accordingly, the codec and the devices having the codec may reduce a frame drop in an image data transmission, and decrease deterioration of an image quality.

The codec and other processing features of the embodiments described herein may be implemented in logic, which, for example, may include hardware, software, or both. When implemented at least partially in hardware, the controllers and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the codec and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A codec, comprising:
  a codec processor to receive a current frame, determine a type of a received current frame, and set rate control parameters of the current frame;
  a bit-rate estimator to allocate total target bits to a first group of picture (GOP) including the current frame, and allocate a target bit to each of frames included in the first GOP based on a determined type of the current frame and set rate control parameters; and
  a code rate controller to generate a quantization parameter for each of blocks included in the current frame using the rate control parameters,
  wherein,
  the bit-rate estimator is to set the total target bits to the first GOP using a number of the bits remaining after performing the encoding in a second GOP including a previous frame when operating in a first mode, and, is to set the total target bits to the first GOP regardless of the number of the bits remaining after performing encoding in a second GOP when operating in a second mode, and,
  the code rate controller is to adjust the set rate control parameters of the current frame, and to adjust the quantization parameter using the adjusted set rate control parameters, when operating in the second mode.

2. The codec as claimed in claim 1, wherein, when the type of the current frame is an intra frame (I-frame), the bit-rate estimator is to allocate the total target bits to the first GOP and allocate a target bit to the current frame using the total target bits allocated to the first GOP.

3. The codec as claimed in claim 1, wherein, when the type of the current frame is not an intra frame (I-frame), the bit-rate estimator is to allocate the target bit to the current frame using a difference between the number of the total target bits allocated to the first GOP and the number of bits used to encode previous frames included in the first GOP.

4. The codec as claimed in claim 3, wherein the bit-rate estimator is to allocate the target bit to the current frame based on the number of frames included in a first GOP that are not processed.

5. The codec as claimed in claim 1, further comprising:
  an encoder to encode the current frame and output an encoded current frame; and
  a codec memory to store the encoded current frame,
  wherein the codec processor is to check whether or not the codec memory is saturated based on the encoded current frame stored in the codec memory.

6. The codec as claimed in claim 5, wherein, when the codec memory is saturated, the codec processor skips encoding for remaining frames included in the first GOP.

7. The codec as claimed in claim 5, wherein the code rate controller is to generate the quantization parameter for each of the blocks included in the current frame using a saturation degree of the codec memory and the rate control parameters.

8. The codec as claimed in claim 5, wherein, when operating in the second mode:
  the code rate controller is to transmit the quantization parameter adjusted on a block basis to the encoder, and the encoder is to encode each of the blocks included in the current frame using the quantization parameter adjusted on a block basis.

9. The codec as claimed in claim 1, wherein, when the determined type of the current frame is an intra frame (I-frame), the code rate controller generates a quantization parameter that is greater than a quantization parameter generated when the current frame is not an I-frame.

10. A system on chip, comprising:
a pre-processing circuit to process image data, generate, and output a current frame using processed image data; and
a codec to receive the current frame and encodes the current frame,
wherein the codec includes
a codec processor to receive a current frame, determine a type of a received current frame, and set rate control parameters of the current frame;
a bit-rate estimator to allocate total target bits to a first group of picture (GOP) including the current frame, and allocate a target bit to each of frames included in the first GOP based on a determined type of the current frame and set rate control parameters; and
a code rate controller to generate a quantization parameter for each of blocks included in the current frame using the rate control parameters,
wherein,
the bit-rate estimator is to set the total target bits to the first GOP using a number of bits remaining after performing the encoding in a second GOP including a previous frame when operating in a first mode, and, is to set the total target bits to the first GOP regardless of the number of the bits remaining after performing encoding in a second GOP when operating in a second mode, and,
the code rate controller is to adjust the set rate control parameters of the current frame, and to adjust the quantization parameter using the adjusted set rate control parameters, when operating in the second mode.

11. The system on chip as claimed in claim 10, wherein, when the type of the current frame is an intra frame (I-frame), the bit-rate estimator is to allocate the total target bits to the first GOP and allocate a target bit to the current frame using the total target bits allocated to the first GOP regardless of a second GOP including a previous frame.

12. The system on chip as claimed in claim 10, wherein, when the type of the current frame is not an intra frame (I-frame), the bit-rate estimator is to allocate the target bit to the current frame using a difference between the number of the total target bits allocated to the first GOP and the number of bits used to encode previous frames included in the first GOP.

13. The system on chip as claimed in claim 12, wherein the bit-rate estimator is to allocate the target bit to the current frame based on the number of frames included in a first GOP that are not processed.

14. The system on chip as claimed in claim 10, further comprising:
an encoder to encode the current frame and output an encoded current frame; and
a codec memory to store the encoded current frame,
wherein the codec processor is to check whether or not the codec memory is saturated based on the encoded current frame stored in the codec memory.

15. The system on chip as claimed in claim 14, wherein, when the codec memory is saturated, the codec processor skips encoding for remaining frames included in the first GOP.

16. The system on chip as claimed in claim 14, wherein the code rate controller is to generate the quantization parameter for the each of the blocks included in the current frame using a saturation degree of the codec memory and the rate control parameters.

17. The system on chip as claimed in claim 14, wherein, when operating in the second mode:
the code rate controller is to transmit the quantization parameter adjusted on a block basis to the encoder, and
the encoder is to encode each of the blocks included in the current frame using the quantization parameter adjusted on a block basis.

18. The system on chip as claimed in claim 10, wherein, when the determined type of the current frame is an intra frame (I-frame), the code rate controller generates a quantization parameter that is greater than a quantization parameter generated when the current frame is not an I-frame.

19. A codec, comprising:
a codec processor to receive a current frame, determine a type of a received current frame, set rate control parameters of the current frame, and determine whether image data is to be encoded in a first mode or in a second mode;
a codec memory to store image data; and
a code rate controller to, when image data is to be encoded in the first mode, generate a quantization parameter for each block in the current frame using a saturation degree of the codec memory and rate control parameters, and, when image data is to be encoded in the second mode, to adjust the rate control parameters of the current frame and generate a quantization parameter for each block in the current frame using a saturation degree of the codec memory and adjusted rate control parameters.

20. The codec as claimed in claim 19, wherein, when the determined type of the current frame is an intra frame (I-frame), the code rate controller generates a quantization parameter that is greater than a quantization parameter generated when the current frame is not an I-frame.

* * * * *